United States Patent [19]
Dawson

[11] 3,951,188
[45] Apr. 20, 1976

[54] TREE DE-LIMBER
[75] Inventor: Kenneth R. Dawson, Rustburg, Va.
[73] Assignee: The Raymond Lee Organization, Inc., New York, N.Y. ; a part interest
[22] Filed: July 28, 1975
[21] Appl. No.: 599,455
[52] U.S. Cl. .............................. 144/2 Z; 30/121.5; 30/279 R
[51] Int. Cl.² ......................................... A01G 23/08
[58] Field of Search .............. 30/121.5, 280, 279 R, 30/299; 144/2 Z

[56] References Cited
UNITED STATES PATENTS
2,493,588   1/1950   Martin .............................. 30/121.5

Primary Examiner—Othell M. Simpson
Assistant Examiner—W. D. Bray
Attorney, Agent, or Firm—Howard I. Podell

[57] ABSTRACT

A portable apparatus that may be employed to rapidly remove the limbs from the trunk of a tree passed through the apparatus. The apparatus incorporates a pair of semi-circular curved blades, with each blade mounted to an arm. A first arm is fixed to the base of the apparatus with the end of the second arm fitted to a crank shaft that is engaged in the end of the first arm permitting the cutting edge of the second arm to move towards or away from the cutting edge of the first arm in a curved path. A frame fixed to the structure guides a projection extending from the side of the second arm to limit the motion of the second arm with respect to the first arm and a hydraulic cylinder or spring is mounted to the structure to apply a bias force to the two arms so that each cutting edge will follow the tapered diameter of a tree trunk passed transversely to the arms, so as to cut the limbs from the tree trunk.

4 Claims, 5 Drawing Figures

TREE DE-LIMBER

SUMMARY OF THE INVENTION

My invention is a portable apparatus that may be employed to rapidly remove the limbs from the trunk of a tree passed through the apparatus. The apparatus incorporates a pair of semi-circular curved blades, with each blade mounted to an arm. A first arm is fixed to the base of the apparatus with the end of the second arm fitted to a crank shaft that is engaged in the end of the first arm permitting the cutting edge of the second arm to move towards or away from the cutting edge of the first arm in a curved path. A frame fixed to the structure guides a projection extending from the side of the second arm to limit the motion of the second arm with respect to the first arm and a hydraulic cylinder or spring is mounted to the structure to apply a bias force to the two arms so that each cutting edge will follow the tapered diameter of a tree trunk passed transversely to the arms, so as to cut the limbs from the tree trunk.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
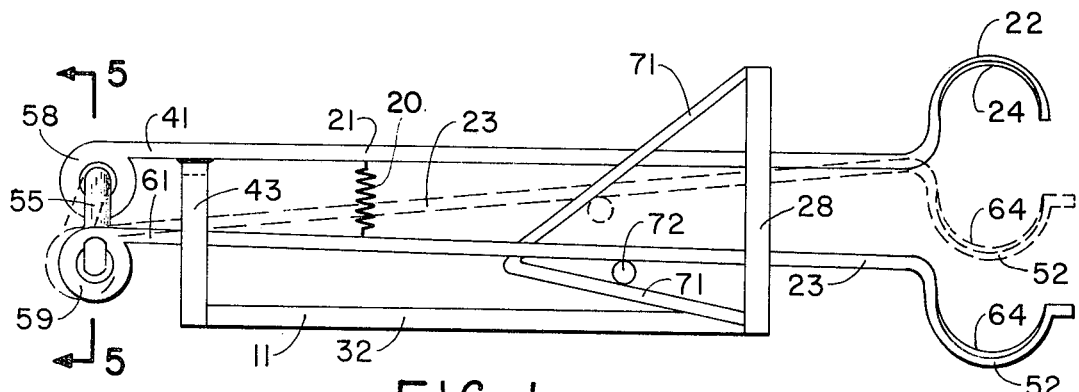
FIG. 1 is a side view of the apparatus.
Figure 2:
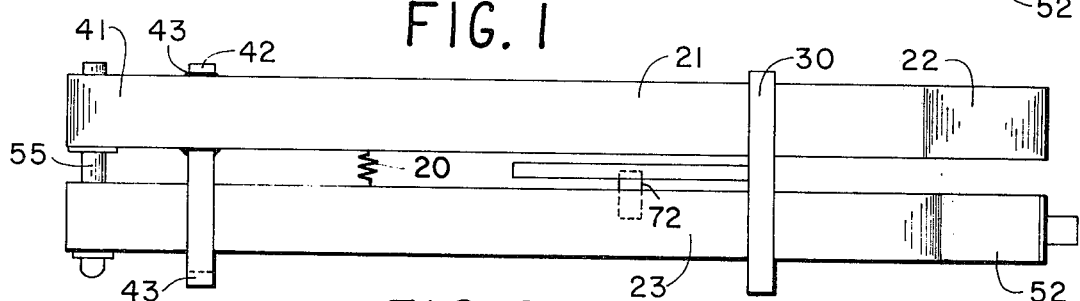
FIG. 2 is a plan view of the apparatus.
Figure 3:
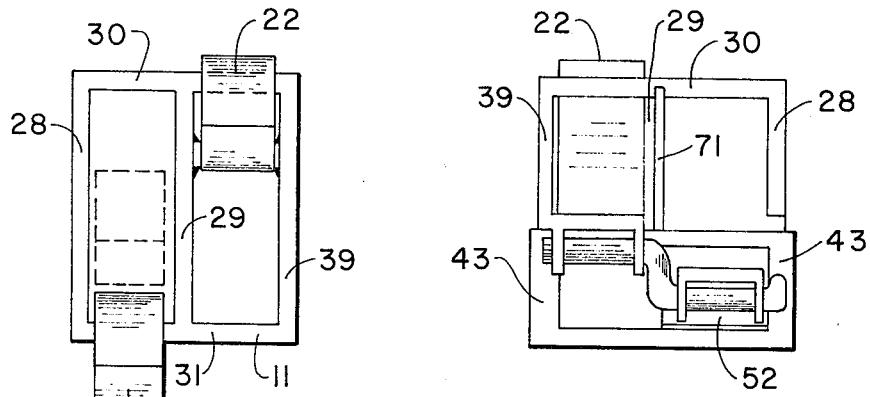
FIG. 3 is a front end view of the apparatus.
Figure 4:
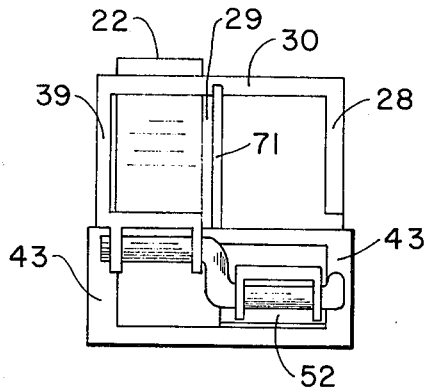
FIG. 4 is a rear end view of the apparatus.
Figure 5:
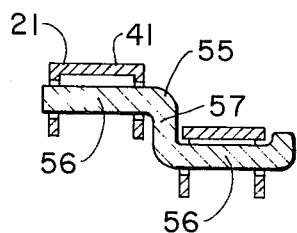
FIG. 5 is a sectional rear end view taken through line 5—5 of FIG. 1.

Turning now descriptively to the drawings, in which similar reference characters denote similar elements throughout the several views, FIGS. 1–5 illustrate the apparatus 10 which is formed of a frame structure 11 to which an arm member 21 is fixed. The front end of arm member 21 is formed as a semi-cylindrical hook section 22 with the edge 24 of hook section which faces pivotable arm member 23 sharpened to a knife edge. Hook section 22 projects beyond frame structure 11 so as to engage the sides of a tree trunk passed transversely to the arm member 21.

A pivotable arm member 23 is mounted to the side of arm member 21 being held in a slidable manner in frame structure 11 between a frame base rod 31, an outer vertical rod 28, a top horizontal rod 30 and an inner vertical rod 29, all fixed to the based rod 32 of frame 11. Fixed arm 21 is welded to inner vertical rod 29 and an external vertical rod 39 that is also joined to rods 30 and 31.

Pivotable arm member 23 terminates in its front end in a semi-cylindrical hook section 52 of the size of hook section 22, with the edges 64 of hook section 52 sharpened and with the concave sections of hook sections 52 and 22 facing each other.

The rear end 41 of fixed arm 21 projects beyond the rear of frame structure 11, with arm 21 welded to top horizontal support rod 42 that is fastened by two vertical rods 43 with rear end 41 shaped as a bearing barrel 58 to pivotably engage a first crank arm 56 of crank pin 55.

Crank pin 55 is formed with two straight crank arms 56 each joined in perpendicular orientation to crank radius section 57. The second crank arm 56 of crank pin 55 is pivotably mounted to a barrel shaped end 59 of the rear end 61 of pivotable arm member 23 so that pivotable arm member 23 may move with respect to fixed arm member 21 with hook section 52 of pivotable arm member 23 moving towards or away from hook section 22 of fixed arm member 21 so as to engage the side of a tree trunk passed between hook sections 22 and 52, as shown in dash lines in FIG. 1.

A shaped angular guide member 71 is fixed at its upper end to horizontal member 30 and at its lower end to base member 31 with a pin 72 projecting from arm member 23 being guided by frame member 71 to limit the travel of arm member 23.

A hydraulic cylinder or spring 20 is fastened to pivotable arm member 23 and arm member 21 to maintain the cutting edges 24 and 64 of both arm member hook sections adjacent to the sides of a tapered tree trunk passed transversely through both hook sections as to cut off limbs projecting from the tree trunk. Arm member 23 may pivot in both a longitudinal direction and a direction towards or away from arm member 21 so as to follow the sides of a tree trunk engaged by the hook sections of both arm members.

Since obvious changes may be made in specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A device of cutting limbs from a tree trunk comprising
    a frame structure,
    a first arm member fixed to the frame structure to project beyond the frame structure, and
    a second arm member slidably mounted to the frame structure with an end projecting beyond the frame structure so as to be oriented adjacent the said projecting end of the first arm member,
    the projecting ends of each arm member being formed in a circular arcuate shape about a generally common central point and with an edge of each said arcuate section sharpened so as to cut the limbs from a tree trunk passed through the central section of both arcuate shapes, together with
    means to force the arcuate sections of both arms towards each other.

2. The combination as recited in claim 1 in which each of said arms are pivotably joined at the arm end opposed to the arcuate end by a pin.

3. The combination as recited in claim 2 in which the pin is shaped as a crank with two straight pintle sections joined to a common radial section perpendicular to both pintle sections.

4. The combination as recited in claim 1 in which the second arm is fitted with a projection extending from the side of the second arm and the frame is formed with a guide rod that limits the travel of the second arm when the projection bears against the guide rod.

* * * * *